United States Patent
Lambrechts et al.

(10) Patent No.: US 7,871,695 B2
(45) Date of Patent: Jan. 18, 2011

(54) REINFORCED STRUCTURE COMPRISING A CEMENTITIOUS MATRIX AND ZINC COATED METAL ELEMENTS

(75) Inventors: Ann Lambrechts, Herentals (BE); Johan Vanbrabant, Zwevegem (BE)

(73) Assignee: NV Bakaert SA, Zwevegem (BG)

( * ) Notice: Subject to any disclaimer, the term of this patent is extended or adjusted under 35 U.S.C. 154(b) by 660 days.

(21) Appl. No.: 11/722,434

(22) PCT Filed: Dec. 16, 2005

(86) PCT No.: PCT/EP2005/056868

§ 371 (c)(1), (2), (4) Date: Jun. 21, 2007

(87) PCT Pub. No.: WO2006/067095

PCT Pub. Date: Jun. 29, 2006

(65) Prior Publication Data

US 2010/0021759 A1    Jan. 28, 2010

(30) Foreign Application Priority Data

Dec. 23, 2004  (EP) ................... 04106930

(51) Int. Cl.
*B32B 13/02*    (2006.01)
(52) U.S. Cl. .................... 428/294.7; 428/624
(58) Field of Classification Search ............. 428/294.7, 428/624
See application file for complete search history.

(56) References Cited

U.S. PATENT DOCUMENTS

| | | | |
|---|---|---|---|
| 4,442,021 A | | 4/1984 | Bürge et al. |
| 5,125,953 A | * | 6/1992 | Gattner et al. ............... 504/155 |
| 5,346,962 A | * | 9/1994 | Hergenrother et al. ...... 525/281 |
| 5,597,514 A | | 1/1997 | Miksic et al. |
| 5,618,634 A | * | 4/1997 | Hosoda et al. ............... 428/610 |
| 5,683,751 A | | 11/1997 | Derule et al. |
| 5,744,239 A | * | 4/1998 | Buccellato et al. ........ 428/411.1 |
| 6,197,805 B1 | * | 3/2001 | Smith .......................... 514/388 |
| 6,436,184 B1 | * | 8/2002 | Ceccaldi et al. ............. 106/715 |
| 6,897,191 B2 | * | 5/2005 | Batdorf ........................ 510/382 |
| 7,595,009 B2 | * | 9/2009 | Geer et al. .................... 252/512 |
| 2010/0021759 A1 | * | 1/2010 | Lambrechts et al. ......... 428/624 |

FOREIGN PATENT DOCUMENTS

| | | |
|---|---|---|
| JP | 53-78625 | 7/1978 |
| JP | 54-72223 A | 6/1979 |
| JP | 61-141650 A | 6/1986 |
| JP | 5-65680 A | 3/1993 |

\* cited by examiner

*Primary Examiner*—N. Edwards
(74) *Attorney, Agent, or Firm*—Foley & Larnder LLP

(57) ABSTRACT

The invention relates to a reinforced structure comprising a cementitious matrix and zinc coated metal elements. The structure comprises at least at the interface of the zinc coated metal elements and the cementitious matrix a compound selected from the group consisting of the imidazoles, the triazoles and the tetrazoles. The invention further relates to a zinc coated metal element for the reinforcement of a cementitious matrix and to a method to inhibit hydrogen gas evolution at the interface of zinc coated metal elements embedded in a cementitious matrix.

8 Claims, 1 Drawing Sheet

REINFORCED STRUCTURE COMPRISING A CEMENTITIOUS MATRIX AND ZINC COATED METAL ELEMENTS

FIELD OF THE INVENTION

The invention relates to a cementitious matrix reinforced with zinc coated metal elements and to zinc coated metal elements for the reinforcement of a cementitious matrix.

The invention further relates to a method to inhibit hydrogen gas evolution during the hardening of concrete reinforced with zinc coated metal elements.

BACKGROUND OF THE INVENTION

It is generally known to reinforce concrete with metal elements, such as steel fibers, for example to give the matrix the required tensile properties.

As bare steel fibers may suffer from corrosion, galvanized steel fibers have been proposed to give the fibers a long term corrosion resistance. Galvanized reinforcing steel elements are especially useful for the reinforcement of concrete for construction purposes whereby the reinforced concrete will be exposed to the weather before construction begins, as for example in prefabrication construction.

However, the use of galvanized steel fibers in concrete is creating problems: during hardening of the concrete, the galvanized surface of the steel elements will react with the alkaline concrete to form zinc salts accompanied by hydrogen gas evolution.

The hydrogen gas evolution is leading to aesthetical problems as well as to strength and durability problems.

Due to hydrogen gas evolution at the interface of the metal elements and the concrete, the bond strength between the metal elements and the concrete is reduced. This is resulting in a reduction of the strength of the reinforced concrete.

The durability problem is the result of the reduction in the thickness of the zinc or zinc alloy coating due to the reaction of the zinc or zinc alloy coating in the alkaline environment.

The problems of galvanized steel fibers in concrete are described in "Effect of chemical-physical interaction between galvanized steel fibres and concrete", T. Belleze, R. Fratesi, C. Failla, $6^{th}$ RILEM Symposium on Fibre-Reinforced Concretes (FRC) BEFIB 2004, 20-22 Sep. 2004, 239-248.

To prevent the hydrogen gas evolution, the zinc surfaces can be passivated. This can be realised by treating the galvanized steel elements with a chromium based compound. Also the chromate naturally present in the concrete can be sufficient to protect the galvanized steel elements.

However, in recent years it has been recognized that hexavalent chromium raises serious environmental and health problems. Consequently, strict restrictions have been placed on the quantity of hexavalent chromium used in a number of industrial processes and products as for example cement and concrete.

Other attempts to protect the galvanised steel comprise the application of an epoxy coating on the galvanised steel. The use galvanised steel coated with an epoxy coating to reinforce concrete is for example described in JP 53-078625.

The epoxy coating acts solely as a barrier against a corrosive environment. If there are defects in the epoxy coating through which aggressive agents can penetrate the barrier, corrosion will concentrate on these areas. Defects in the coating will thus cause local hydrogen gas evolution and will result in a loss of bond strength.

Integrity of the epoxy coating is therefore essential as the film must be free from pores, cracks and damaged areas.

Epoxy coatings are fragile. Epoxy coated metal elements must therefore be handled with a lot of care during storing, transport and handling.

As the mixing of the reinforcement elements in the concrete is a robust operation whereby local damages on the surface of the reinforcement elements are unavoidable, the use of epoxy coated metal elements for the reinforcement of concrete is not a good option.

Many corrosion inhibitors known in the art such as phosphates, silicates, silanes, carbonates and carbonic acids, sulfides and mercaptoderivates, amines and sulfonates have been tested. However, these inhibitors did not give an adequate result as they were not able to avoid hydrogen gas evolution.

Therefore, obtaining an adequate protection of zinc or zinc coated metal elements without using chromium compounds and not requiring a 100% closed barrier coating remains to be a problem and efficient solutions are still needed.

SUMMARY OF THE INVENTION

It is an object of the present invention to provide a reinforced structure comprising a cementitious matrix and zinc coated metal elements avoiding the drawbacks of the prior art.

It is another object of the invention to provide a reinforced structure that is free of hexavalent chromium.

It is a further object of the invention to provide a zinc coated metal element for the reinforcement of a cementitious matrix.

It is still a further object to provide a method to inhibit hydrogen gas evolution at the interface of zinc coated metal elements dispersed in a cementitious matrix during the hardening of the cementitious matrix. Furthermore, it is an object to provide a method to increase the short term corrosion protection of a zinc coated metal element dispersed in a cementitious matrix.

According to a first aspect of the present invention a reinforced structure comprising a cementitious matrix and zinc coated metal elements is provided.

The zinc coated metal elements are brought in the cementitious matrix and are surrounded by the cementitious matrix, creating an interface zinc coated metal element-cementitious matrix.

The reinforced structure according to the present invention comprises at least at the interface of the zinc coated metal elements and the cementitious matrix a compound giving the zinc coated metal elements cathodic protection. The compound is selected from the group consisting of the imidazoles, the triazoles and the tetrazoles.

The main function of this compound is to avoid the hydrogen gas evolution at the interface of the zinc coated metal elements and the cementitious matrix during the mixing, pouring, setting and/or hardening of the reinforced structure.

The critical period in which the galvanized surface of the metal elements needs protection is the period in which the cementitious matrix is hardening, i.e. the first 24 hours till the first 72 hours after the casting.

To obtain an adequate protection of the zinc coated metal elements, the compound according to the present invention is preferably present in a concentration between 0.005 and 2%, for example between 0.04 and 0.2%. The concentration is expressed in wt % relative to the mixing water used to prepare the cementitious matrix.

In a preferred embodiments of the present invention the imidazole comprises silyl-imidazole such as N-(trimethylsilyl)-imidazole or benzimidazole, such as 2-mercaptobenzimidazole or 2-mercapto-1-methylbenzimidazole.

In the reinforced structure according to the present invention, the compound has to be present at least at the interface of the zinc coated metal elements and the cementitious matrix.

Any technique that allows that the compound is present at the interface of the zinc coated metal elements and the cementitious matrix can be considered to apply the compound.

In a first embodiment, the compound is applied on the zinc coated metal elements before these metal elements are introduced in the cementitious matrix. The compound can for example be incorporated in a coating layer applied on the zinc coated metal element before these elements are introduced in the cementitious matrix.

As an example, the compound can be added to a glue applied on the zinc coated metal elements before these metal elements are introduced in the cementitious matrix.

In an alternative embodiment, the compound is added to the cementitious matrix or to at least one component of the cementitious matrix and the zinc coated metal elements are introduced to the cementitious matrix comprising this compound.

A great advantage of a reinforced structure according to the present invention is that the reinforced structure is free of hexavalent chromium as hexavalent chromium is not required to protect the zinc coated metal elements. This means that the metal elements do not require a treatment with a chromium based compound.

A further advantage of a reinforced structure according to the present invention is that a good protection of the zinc coated metal elements is also obtained in case cement free of hexavalent chromium is used.

Up to now, even in case no chromium base compounds are added to protect the zinc coated metal elements, zinc coated metal elements could take advantage of the chromium naturally present in cement.

New legislation is imposing to limit the amount of hexavalent chromium in cement to minimize the occurrence of chromate related allergic dermatitis. Consequently, zinc coated metal elements in a cementitious matrix can no longer take advantage of the chromium naturally present in cement.

To obtain cement free of hexavalent chromium cement producers have developed techniques such as dosing with ferrous sulphate. The addition of ferrous sulphate increases dramatically the amount of hydrogen gas evolution.

It is a great advantage of the present invention that hydrogen gas evolution is also prevented in case cement free of hexavalent chromium is used and in case cement is dosed with ferrous sulphate.

For the purpose of this invention, "cementitious matrix" should be understood to mean the matrix material apart from the metal elements. The cementitious matrix may comprise any material comprising cement as for example concrete or mortar.

"Metal elements" should be understood to mean the elements reinforcing the cementitious matrix.

The metal element may comprise any kind of metal reinforcement element such as a metal wire, metal cord, metal fiber, a metal bar, metal sheet or metal mesh.

The metal element may be made of any metal or metal alloy known in the art. The metal elements are preferably made of steel.

Preferred metal elements to reinforce a cementitious matrix are steel fibers sold amongst others by the applicant NV Bekaert SA under the brand name DRAMIX.

Mostly, steel fibers are used with a tensile strength comprised e.g. between 500 and 3000 N/mm$^2$.

The used fibers can e.g. be straight. Preferably, the fibers have a form that makes it rather difficult to pull them out of the hardened cementitious matrix using a tensile strain. To that end, the fibers are e.g. hooked end, corrugated or their cross-section-surface varies along the length.

For steel fibers, the thickness or diameter preferably varies from 0.1 to 1.2 mm. The length-diameter ratio for steel fibers is, for practical and economical reasons, mostly situated between 10 and 200 and preferably minimally amounts to 40. For non-straight fibers, the length is the rectilinear distance between the ends of the fibers, whereas the diameter of fibers of which the diameter varies along the length is defined as the average diameter over the entire length.

The zinc coated metal elements may have a zinc or zinc alloy coating.

As zinc alloy coating one can consider for example Zn—Fe, Zn—Ni, Zn—Al, Zn—Mg, Zn—Mg—Al alloys.

A preferred zinc alloy coating is a Zn—Al alloy coating comprising between 2 and 15% Al.

Possibly, between 0.1 and 0.4% of a rare earth element such as Ce and/or La can be added.

The reinforced structure according to the present invention can be used for any application known in the art such as prefabrication constructions, bridges, buildings, tunnels, parking garages, offshore oil platform, . . . .

According to a second aspect of the present invention a zinc coated metal element for the reinforcement of a cementitious matrix is provided. The zinc coated metal element is coated with a layer comprising a compound selected from the group consisting of the imidazoles, the triazoles and the tetrazoles.

The coating layer comprises for example a glue comprising said compound.

The metal element may comprise any kind of metal reinforcement element such as a metal wire, metal cord, metal fiber, metal bar, metal sheet or metal mesh.

The metal element may be made of any metal or metal alloy known in the art. The metal elements are preferably made of steel.

Preferred metal elements are steel fibers.

According to a third aspect of the invention a method to inhibit hydrogen gas evolution at the interface of zinc coated metal elements embedded in a cementitious matrix is provided.

The method comprises the steps of providing zinc coated metal elements, introducing said zinc coated metal elements in a cementitious matrix, and treating said zinc coated metal elements and/or said cementitious matrix with a compound selected from the group consisting of the imidazoles, the triazoles and the tetrazoles.

The method according to the present invention is avoiding hydrogen gas evolution during the mixing, pouring, setting and/or hardening of the reinforced structure.

The critical period in which the galvanized surface of the metal elements needs protection is the period in which the cementitious matrix is hardening, i.e. the first 24 hours till the first 72 hours after the casting.

The treatment with said compound may comprise any technique that allows bringing the zinc coated metal elements and the cementitious matrix at least at their interface in contact with the above-mentioned compound.

The compound can for example be added to the cementitious matrix.

Alternatively, the compound can be added by applying a coating layer comprising this compound on the zinc coated metal elements before this zinc coated metal elements are introduced in the cementitious matrix.

In a preferred embodiment the compound is added to a glue applied on a zinc coated metal element or on a number of zinc coated metal elements before the zinc coated metal elements are introduced in the cementitious matrix.

It is well known in the art to introduce metal elements such as steel fibers to a cementitious matrix in the form of strips in which the fibers are bound together by a glue. The use of such strips avoids that the fibers come to conglomerate into balls during the mixing movement instead of being equally distributed.

The glue is chosen in such a way that it is dissolving, melting, softening or breaking mechanically once it is added to the cementitious matrix, so that the strips come to disintegrate into separate fibers and are equally distributed over the cementitious matrix.

By adding a compound according to the present invention the short-term corrosion protection of the zinc coated metal elements, i.e. the corrosion protection during the hardening of the cementitious matrix, is guaranteed.

BRIEF DESCRIPTION OF THE DRAWINGS

The invention will now be described into more detail with reference to the accompanying drawings wherein.

Figure 1:
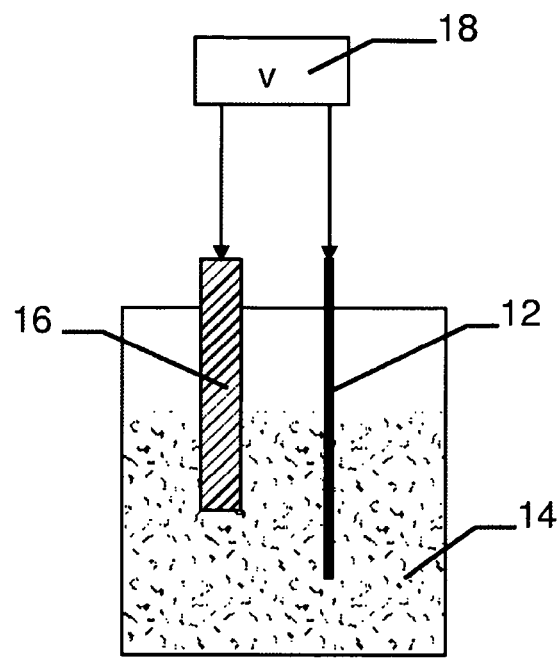
FIG. 1 is an illustration of the measurement of the potential in a fresh construction matrix

DESCRIPTION OF THE PREFERRED
EMBODIMENTS OF THE INVENTION

In a reinforced structure according to the present invention zinc coated metal elements are embedded in a cementitious matrix as for example concrete.

The wet concrete is acting as the electrolyte in which corrosion may occur.

Water is capable of decomposing into hydrogen and oxygen. The decomposition of water is an electrochemical redox reaction which occurs at a certain potential. The electrochemical potential at which the decomposition takes place is determined by the pH according to the law of Nernst.

The decomposition potential of water at which hydrogen gas is formed is according to the law of Nernst:

$$E_{H_2} = E_{H_2}^0 - 0.059 * pH$$

whereby $E_{H_2}^0 = 0$ versus a standard hydrogen electrode.

The decomposition potential of water at which oxygen is formed is according to the law of Nernst:

$$E_{O_2} = E_{O_2}^0 - 0.059 * pH$$

whereby $E_{O_2}^0 = +1.226$ V versus a standard hydrogen electrode.

A list of the $E^o$ or standard potentials can be found in: The handbook of Chemistry and Physics, the electrochemical series, p. D151-D158, $67^{th}$ edition, 1986.

The decomposition potentials of water in function of pH are described in the Atlas of electrochemical equilibria in aqueous solutions by Marcel Pourbaix-Cebelor, $2^{nd}$ edition 1997, p. 98-105.

When a strong electronegative element like zinc, aluminium or magnesium is exposed to water, the element has an open circuit potential as defined in the standard ASTM G15-93. The open circuit potential is also referred to as rest potential or standard potential. At high pH values, the open circuit potential drops below the hydrogen evolution potential and hence initiates the reduction of hydrogen ions resulting in hydrogen gas evolution. The hydrogen evolution is calculated, based on a pH measurement of the environment whereto the material will be exposed.

The pH is of a cementitious matrix is measured according to test method ASTM G51-95. This method covers a procedure for determining the pH of a soil in corrosion testing. For the purpose of this application the test method ASTM G51-95 is applied for a cementitious matrix instead of a soil.

For a sample comprising one part cement and four parts sand (instead of soil according to ASTM51-95), a pH of 13.04 was found.

According to the law of Nernst $E_{H_2}$ can be calculated:

$$E_{H_2} = E_{H^o} - 0.059 * pH$$

$E_{H_2} = -0.7694$ V (versus the standard hydrogen electrode potential)

This means that when the open circuit potential of a reinforcement material being introduced in this type of cementitious matrix drops below the value −0.7694 V hydrogen gas will be formed.

The open circuit potential can easily be measured in situ in the construction material for example during the first hours after the casting of the cementitious matrix. The most critical period in which hydrogen gas evolution is detrimental is the first 24 till the first 72 hours after casting.

Once the composite is hardened, the risk of hydrogen gas evolution is neglectible.

The open circuit potential can be measured in situ according to standard ASTM C876. However it is more appropriate to measure the open circuit potential in a small sample as for example shown in FIG. 1. The equipment is used according to standard ASTM G3-89(94).

A zinc coated metal element 12 is embedded in a cementitious matrix 14. The electrical potential between the zinc coated metal element 12 and a reference electrode 16 is measured by means of an electrometer or high impedance voltmeter 18.

To evaluate the reinforcing structure according to the present invention, three different samples are compared. The three samples all comprise a cementitious matrix obtained by mixing one part of CEM II 42.5R cement with four parts of sand and 5 parts of water.

The three samples were reinforced with different metal elements:
sample 1 comprises untreated steel fibers,
sample 2 comprises chromium treated steel fibers and
sample 3 comprises steel fibers treated with benzimidazole.

The pH of the cementitious matrix was determined. A pH value of 12.25 was found.

According to the law of Nernst, the $E_{H_2}$ is determined to be:

$$E_{H_2} = E_{H^o} - 0.059 * pH$$

$E_{H_2} = -0.7228$ V (versus the standard hydrogen electrode potential)

Figure 2:
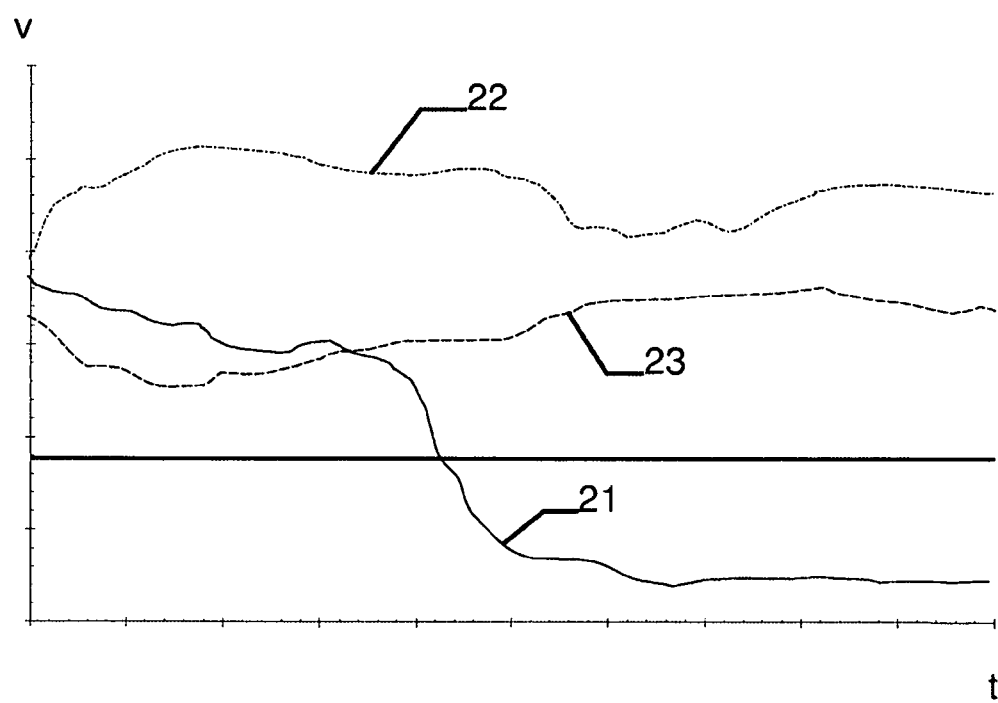
FIG. 2 shows the open circuit potential (OCP) of three different samples in function of time.

The open circuit potential of the three samples in function of the time was measured and is given in FIG. 2. The open circuit potential of sample 1 is given by line 21, the open circuit potential of sample 2 is given by line 22 and the open circuit potential of sample 3 is given by line 23.

After about 24 hours the open circuit potential of the untreated sample (sample 1) drops below the hydrogen evolution potential, resulting in the evolution of hydrogen gas.

For the other two samples (sample 2 and sample 3) the open circuit potential remains above the hydrogen evolution potential.

Consequently, no hydrogen gas is produced.

To evaluate the performance of reinforced concrete under load, two different samples of concrete reinforced with steel fibers are subjected to a load test according to Belgian NBN B15-238 (L=450 mm) to determine the conventional flexural strengths ($F_{f,300}$ and $F_{f,150}$).

Beams (150×150×500 mm) reinforced with steel fibers are subjected to the test.

The concrete composition is the same for the sample 1 and 2.

The dosage of the steel fibers is 20 and 40 kg/m³.

The steel fibers added to the concrete in sample 1 to 2 are treated in a different way:
- sample 1 comprises zinc coated steel fibers treated with a corrosion inhibitor according to the present invention;
- sample 2 comprises zinc coated steel fibers without further treatment.

Before performing the load test, the beams are stored in moist atmosphere during 28 days.

The results of the load test are given in Table 1 for a dosage of 20 kg/m³ and in Table 2 for a dosage of 40 kg/m³.

TABLE 1

| 20 kg/m³ | $F_{f,300}$ (N/mm²) | $F_{f,150}$ (N/mm²) |
| --- | --- | --- |
| Sample 1 | 2.65 | 2.44 |
| Sample 2 | 1.86 | 1.65 |

TABLE 2

| 40 kg/m³ | $F_{f,300}$ (N/mm²) | $F_{f,150}$ (N/mm²) |
| --- | --- | --- |
| Sample 1 | 4.03 | 3.76 |
| Sample 2 | 3.64 | 3.44 |

From Table 1 and Table 2 can be concluded that sample 1 is best performing.

Remarkable is the increase in toughness between sample 1 and 2. Zinc coated steel fibers treated according to the present invention give an increase in toughness of about 10-40%, for example 30%, compared to non treated zinc coated steel fibers.

This is indicating that the cementitious matrix of sample 2 is considerably weakened due to hydrogen gas evolution.

As toughness is a measure of the ability of the concrete to sustain load after the first crack, the reinforcing fibers of sample 1 will be able to hold cracks together under load to a higher extent.

The invention claimed is:

1. A reinforced structure comprising:
   a cementitious matrix, and
   zinc coated metal elements,
   said reinforced structure being treated at least at an interface of said zinc coated metal elements and said cementitious matrix with a compound giving said zinc coated metal element cathodic protection,
   said compound being selected from the group consisting of imidazoles, triazoles and tetrazoles,
   wherein said reinforced structure is free of hexavalent chromium.

2. A reinforced structure according to claim 1, wherein said compound is present in a concentration between 0.005 and 2 wt %, wherein the concentration is expressed relative to mixing water used to prepare the cementitious matrix.

3. A reinforced structure according to claim 1, wherein said imidazole comprises benzimidazole.

4. A reinforced structure according to claim 1, wherein said zinc coated metal elements are coated with a layer comprising said compound before being introduced in said cementitious matrix.

5. A reinforced structure according to claim 1, wherein said compound is added to the cementitious matrix.

6. A reinforced structure according to claim 1, wherein said metal elements comprise metal wires, metal cords, metal fibers, metal bars, metal sheets or metal meshes.

7. A reinforced structure according to claim 1, wherein said metal elements comprise steel fibers.

8. A reinforced structure according to claim 1, wherein said metal elements have a zinc alloy coating.

* * * * *